United States Patent [19]

Hiraoka et al.

[11] Patent Number: 4,789,979
[45] Date of Patent: Dec. 6, 1988

[54] OPTICAL DISK EXCLUSIVELY USED FOR REPRODUCTION WHEREIN GUIDE GROOVES LOCATED BETWEEN DATA MANAGING INFORMATION AND DATA RECORDING REGIONS HAVE NO TRACK ADDRESS SECTIONS

[75] Inventors: Shigehiko Hiraoka, Toyonaka; Makoto Ichinose, Sakai; Isao Satoh, Neyagawa; Tatuo Sugimura, Fukuoka, all of Japan

[73] Assignee: Matsushita Electric Industrial Co., Ltd., Osaka, Japan

[21] Appl. No.: 143,261

[22] Filed: Jan. 5, 1988

Related U.S. Application Data

[63] Continuation of Ser. No. 739,320, May 30, 1985, abandoned.

[30] Foreign Application Priority Data

Jun. 1, 1984 [JP] Japan ................................ 59-113294
Jun. 1, 1984 [JP] Japan ................................ 59-113308
Jun. 5, 1984 [JP] Japan ................................ 59-115002

[51] Int. Cl.$^4$ ............................................. G11B 7/013
[52] U.S. Cl. ................................... 369/275; 369/278; 369/279; 369/32
[58] Field of Search .................. 369/100, 275–279, 369/32

[56] References Cited

U.S. PATENT DOCUMENTS

| | | | |
|---|---|---|---|
| 4,094,013 | 6/1978 | Hill et al. ........................ | 369/278 X |
| 4,290,122 | 9/1981 | Bates et al. .................... | 369/100 X |
| 4,341,952 | 7/1982 | John et al. ..................... | 369/275 X |
| 4,428,075 | 1/1984 | Hazel et al. .................... | 369/275 X |
| 4,443,870 | 4/1984 | Hazel et al. .................... | 369/275 X |
| 4,486,870 | 12/1984 | Pettigrew et al. ............. | 369/275 X |

*Primary Examiner*—Raymond F. Cardillo
*Assistant Examiner*—W. R. Young
*Attorney, Agent, or Firm*—Spencer & Frank

[57] ABSTRACT

An optical disk exclusively used for reproduction has an optically detectable guide groove in which signals have previously been recorded. One type of optical disk exclusively used for reproduction is interchangeable with an optical disk which allows both recording and reproducing operations or enables information recorded thereon to be erased. If such an optical disk is not provided with a guide groove in an unrecorded region remaining between a data managing information region and a data recording region, problems may arise when the optical head of an optical disk apparatus is positioned in the unrecorded region at the time of starting the operation of the apparatus and when the optical head effects retrieval between the data managing information region and the data recording region. Therefore, the unrecorded region is cut by employing a method which is different from the method of cutting the data managing information region and the data recording region, thereby eliminating the above-described problems, allowing the recorded information to be read out at an increased speed and enabling a master disk for optical disks to be cut at high efficiency.

2 Claims, 6 Drawing Sheets

FIG. 1a

PRIOR ART

FIG. 1b

PRIOR ART

OPTICAL DISK EXCLUSIVELY USED FOR REPRODUCTION WHEREIN GUIDE GROOVES LOCATED BETWEEN DATA MANAGING INFORMATION AND DATA RECORDING REGIONS HAVE NO TRACK ADDRESS SECTIONS

This application is a continuation of application Ser. No. 739,320, filed May 30, 1985, now abandoned.

BACKGROUND OF THE INVENTION

1. Field of the Invention

The present invention relates to an optical disk exclusively used for reproduction which has an optically detectable guide groove in which signals have previously been recorded.

2. Description of the Prior Art

Optical disks are capable of recording or reproducing signals in a non-contact manner by means of a laser beam which is narrowed to a minute spot of light and have therefore attracted attention as high-density large-capacity memories. For this reason, a large number of information recording and reproducing apparatus employing optical disks have appeared on the market. When the use of optical disk devices will have expanded in the future a external memories for computer systems or other similar means, operation systems, ready-made programs and data will be supplied by means of optical disks. In other words, there will be a need for optical disks exclusively used for reproduction. Since optical disks are subjected to reproduction by an apparatus which is capable of effecting both recording and reproducing operations, it will be necessary for optical disks exclusively used for reproduction to be consistently interchangeable with optical disks used for both recording and reproducing operations irrespective of their signal recording format.

Figure 1A:
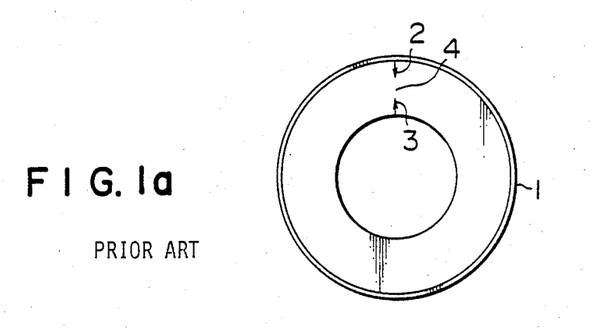
FIGS. 1a and 1b show the format of a conventional optical disk which enables recording to be effected thereon or the recording thereon to be erased, which illustrates the relationship between a data managing information region and a data recording region thereon.
Figure 1B:
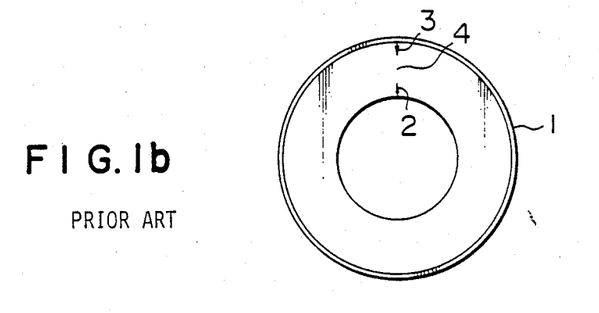

Referring to FIGS. 1a and 1b which show an optical disk used for both recording and reproducing operations, the reference numeral 1 denotes an optical disk, 2 a data managing information region, and 3 a data recording region.

Optical disks used for both recording and reproducing operations have a data recording region which is employed to record information and further a data managing information region employed to record the address information in relation to the data recording region in which the information has been recorded. Incidentally, if the respective capacities of these regions have previously been specified, since the relationship or ratio between the amounts of the recorded data and the recorded data managing information changes depending upon the contents and quality of information to be recorded, it may become impossible for either one of the above-described two regions to be used. To cope with such a problem, one type of optical disk used for both recording and reproducing operations has, as shown in FIG. 1a, the data managing information region 2 provided such as to extend from the outermost periphery of the optical disk 1 toward the inner periphery thereof (or the data recording region 3 provided such as to extend from the innermost periphery of the optical disk 1 toward the outer periphery thereof). The other type of optical disk used for both recording and reproducing operations has, as shown in FIG. 1b, the data recording region 3 provided such as to extend from the outermost periphery of the optical disk 1 toward the inner periphery thereof (or the data managing information region 2 provided such as to extend from the innermost periphery of the optical disk 1 toward the outer periphery thereof). In such an optical disk, every time information is recorded, these two regions, that is, the data managing information region 2 and the data recording region 3 gradually extend from the outermost and innermost peripheries of the optical disk 1 toward its inner and outer peripheries, respectively. When the two regions come in contact with each other, the efficiency of use of the recording area on the optical disk 1 reaches its maximum.

If, however, an optical disk exclusively used for reproduction is arranged in a manner similar to that of the above-described optical disk used for both recording and reproducing operations the following problems arise. Namely, since it is possible for an optical disk to store a large amount of data, the optical disk is not filled to its capacity simply by storing the software and other data which the user considers to be necessary, and an unrecorded region 4 in which no data has yet been recorded therefore remains between the data recording region 3 and the data managing information region 2, as shown in FIGS. 1a and 1b.

In an optical disk which has an optically detectable guide groove, if no guide groove is provided in the above-described unrecorded region 4, a reduction in the production cost of the master disk is then possible when manufacturing optical disks. However, problems may arise in terms of tracking and focusing, for example, when the optical head of an optical disk apparatus is positioned in the unrecorded region 4 at the time of starting the operation of the apparatus. Further, the above-described optical disk does not enable counting of the number of tracks, which would exist in the unrecorded region 4 if a guide groove were provided therein, when the optical head moves between the data managing information region 2 and the data recording region 3 across the unrecorded region 4, which fact involves a possible problem when the optical head is fed for a track accessing operation.

SUMMARY OF THE INVENTION

It is an object of the present invention to provide an optical disk exclusively used for reproduction which is capable of being subjected to reproduction by the same optical disk apparatus as that for an optical disk used for both recording and reproducing operations.

It is another object of the present invention to provide an optical disk exclusively used for reproduction which eliminates the problems which have conventionally been encountered when the optical head is fed for a track accessing operation.

To these ends, the invention provides an optical disk exclusively used for reproduction which comprises: an optically detectable guide groove; a data managing information region provided along the guide groove such as to extend from the outer periphery (or the inner periphery) of the optical disk toward the inner periphery (or the outer periphery) thereof; and a data recording region provided along the guide groove such as to extend from the inner periphery (or the outer periphery) of the optical disk toward the outer periphery (or the inner periphery) thereof, wherein data units are arranged in the data recording region in the reverse order to that of the data unit arrangement in the data managing information region.

Further, the invention provides an optical disk exclusively used for reproduction which has a guide groove formed in an unrecorded region remaining between the data managing information region and the data recording region.

These and other objects, features and advantages of the present invention will become clear from the following description of the preferred embodiments thereof, taken in conjunction with the accompanying drawings.

DESCRIPTION OF THE PREFERRED EMBODIMENTS

Preferred embodiments of the present invention will be described hereinunder in detail.

According to the invention, the unrecorded region remaining between the data managing information region and the data recording region on an optical disk exclusively used for reproduction is cut by employing a method which is different from the cutting method for the data managing information region and the data recording region and is such that the interchangeability of the optical disk with an optical disk used for both recording and reproducing operations is properly maintained, thereby allowing the retrieval operation between the above-described regions to be effected with high accuracy and at high speed.

Figure 2:
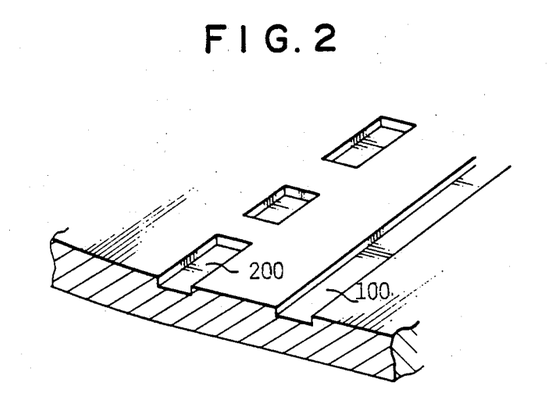
FIG. 2 shows the configuration of a guide groove which may be formed on an optical disk.

According to a first embodiment of the invention, a guide groove with a flat bottom is provided alone in the above-described unrecorded region in the manner shown by the reference numeral 100 in FIG. 2.

According to a second embodiment of the invention, a guide groove with a flat bottom is provided in the unrecorded region, and track addresses are added to tracks in the unrecorded region, one track address being provided for each of a predetermined number of circuits of the guide groove, and each of the track addresses specifying the track address of the associated track in the form of irregularities as shown by the reference numeral 200 in FIG. 2.

A third embodiment of the invention is arranged such as to practically reduce the number of tracks in the unrecorded region by making the track pitch in the unrecorded region larger than that in the data managing information region and the data recording region.

Further, the fourth embodiment of the invention aims at practically eliminating the unrecorded region by employing an arrangement wherein data units for the data managing information region are successively recorded from the innermost or outermost periphery of the optical disk, and data units for the data recording region are successively recorded in the reverse order to that of the data unit arrangement in the data managing information region, that is, data units for the data recording region are successively recorded from that track which is next to the final track in the data managing information region and which is employed as the final track for the data recording region toward the top track of the data recording region.

Each of the embodiments will now be described in detail.

Figure 3:
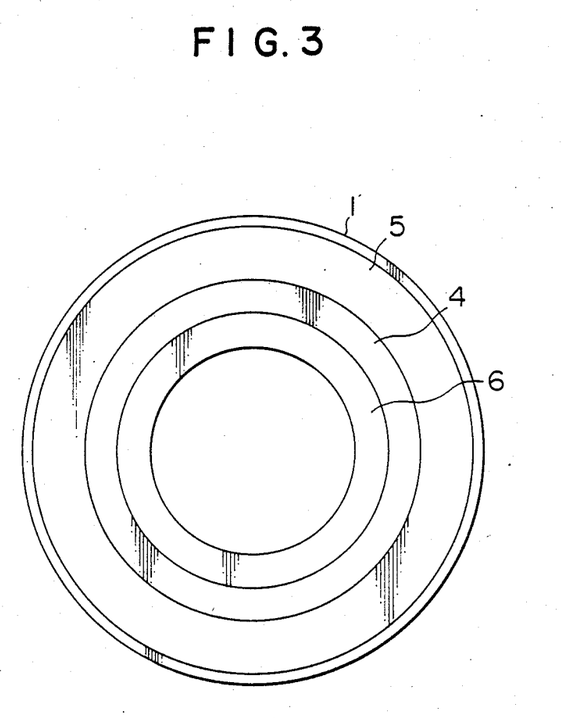
FIG. 3 shows the format of an optical disk exclusively used for reproduction in accordance with first and second embodiments of the present invention.
Figure 4:
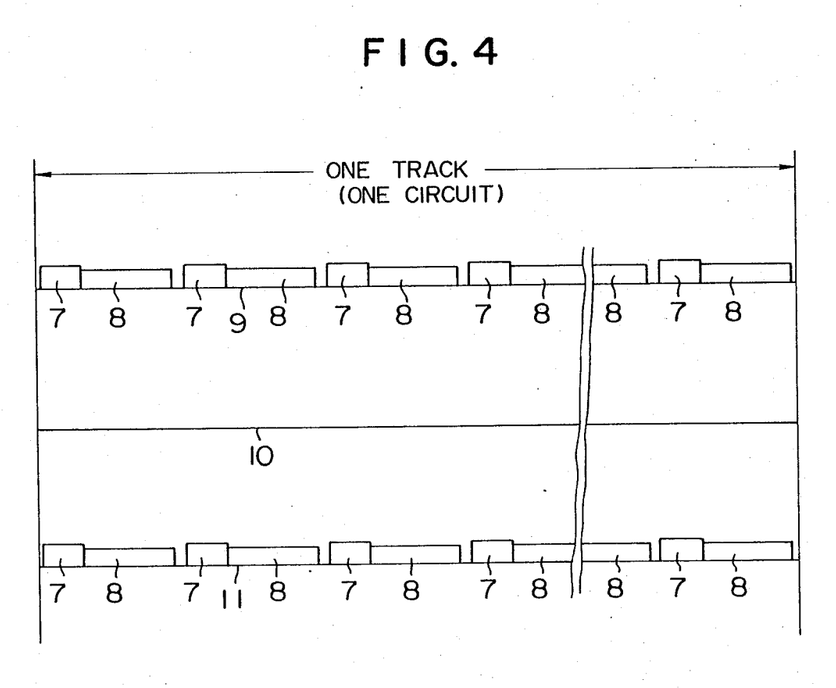
FIG. 4 shows a signal recording format for each track in accordance with the first embodiment of the invention.

Referring to FIG. 3 which shows a signal recording format of an optical disk exclusively used for reproduction in accordance with the first embodiment of the invention, the reference numeral 1 denotes an optical disk, 5 a recording region (I), 6 a recording region (II), and 4 an unrecorded region. The recording region (I) 5 and the recording region (II) 6 in FIG. 3 respectively correspond to those shown in FIGS. 1a and 1b. Either one of the regions 5 and 6 serves as the directory or data managing information region 2, and the other the data recording region 3. Data units in the data managing information region 2 are arranged in the reverse order to that of the data units arranged in the data recording region 3, as will be explained in detail in the description of the fourth embodiment of the invention. The unrecorded region 4 occurs between the recording region (I) 5 and the recording region (II) 6. The present invention particularly pertains to this unrecorded region 4. FIG. 4 shows the signal recording format for each track in accordance with the first embodiment of the invention. In the Figure, the reference numeral 7 denotes an address section, 8 an information recording section, 9 a track in the recording region (I) 5, 10 a track in the unrecorded region 4, and 11 a track in the recording region (II) 6. Information has been written in the respective tracks 9 and 11 in the recording regions (I) 5 and (II) 6 at the time of production of the optical disk. Each of the pieces of the written information has a sector structure which consists of one address section 7 and one information recording section 8. In the case of an optical disk exclusively used for reproduction, both the address section 7 and the information recording section 8 are formed in the guide groove in the shape of irregularities as shown by the reference numeral 200 in FIG. 2.

The tracks 10 in the unrecorded region 4 are constituted by the guide groove alone and have no address section 7 nor information recording section 8. The tracks 10 in the unrecorded region 4 are formed at the same pitch as that of the respective tracks 9 and 11 in the recording regions (I) 5 and (II) 6, whereby it is possible for tracking and focusing to be properly effected even when the optical head is positioned at the unrecorded region 4 at the time of starting the operation of the optical disk apparatus and consequently the movement of the optical head is then immediately brought into its stationary state. Further, when the optical head moves between the recording regions (I) 5 and (II) 6, it crosses an unrecorded region which would lead to an error in counting the number of tracks when the optical head crosses the tracks existing between the recording regions (I) 5 and (II) 6. The optical head is therefore smoothly moved with an increased degree of accuracy. The above-described signal recording format offers the same advantageous effects whether the guide groove is spiral or the tracks are concentrically formed. The first embodiment, however, involves the disadvantage that it is not possible for the position of the optical head to be known at the time of starting the operation of the optical disk apparatus. This disadvantage is overcome by the following second embodiment of the invention.

Figure 5:
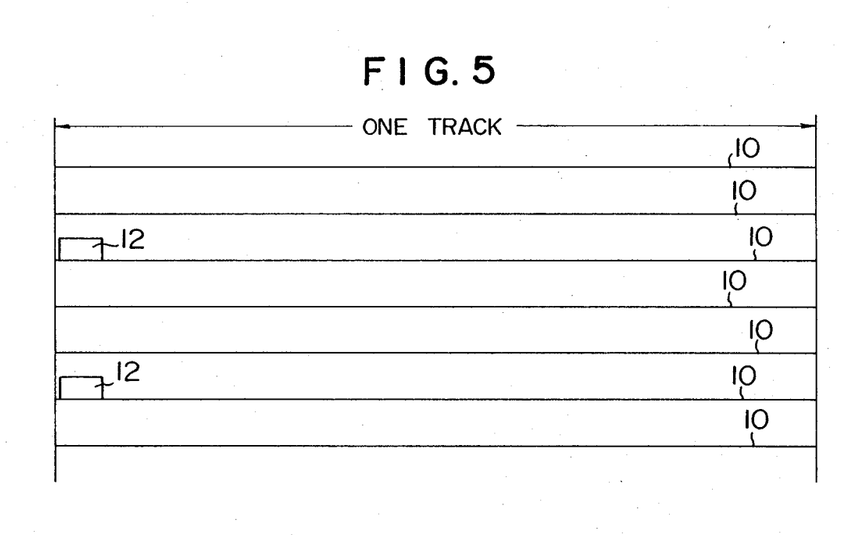
FIG. 5 shows a signal recording format for each track in an unrecorded region on the optical disk in accordance with the second embodiment of the invention.

Referring now to FIG. 5 which shows the signal recording format for each track in the unrecorded region 4 in accordance with the second embodiment of the invention, the reference numeral 10 denotes tracks in the unrecorded region 4, and the numeral 12 represents track address sections. In the embodiment shown in FIG. 5, the track address sections 12 are added to the tracks 10 in the unrecorded region 4 shown in FIG. 4, there being one track address section for each of a predetermined number of circuits of the guide groove, that is, three circuits in this embodiment, and each track address section 12 specifying the track address of the associated track 10. This embodiment offers a particularly advantageous effect when it is applied to an optical disk which has a spiral guide groove. More specifically, it is possible for the position of the optical head to be known within the space of three full turns of the optical disk after the starting of the optical disk apparatus. In the case of an optical disk which has concentric guide grooves, one track address section 12, is provided for every circuit thereof, that is, every track, whereby it is possible to expect the same advantageous effect as the above. It is to be noted that the provision of the track address sections 12 in the unrecorded region 4 may cause an error in counting the number of tracks when the optical head crosses the tracks in the unrecorded region 4 because the light beam passes through the area between the adjacent pits which constitute each of the track address sections 12. The percentage likelihood of such error occurring is, however, small as compared with that in the case where the unrecorded region 4 has a sector structure in which a plurality of sectors are provided on one track, such as that in the recording regions (I) 5 and (II) 6. In the case where one track has one address section, the probability of a track counting error occurring is 1/N as compared with the sector structure in which one track is constituted by N sectors.

In the first and second embodiments, it is possible to provide blank tracks with a sector structure at each of the ends of the unrecorded region 4, so that the optical head will be positioned within these blank tracks even when a maximum track counting error occurs during the time the optical head is crossing the tracks in the unrecorded region 4. In such a case, even when the optical head is positioned halfway through the unrecorded region 4 as the result of the occurrence of a track counting error, the position of the optical head is within the range of the blank tracks with a sector structure. It is therefore possible for the track address to be immediately detected. Thus, it is possible to increase the track accessing speed of the optical head.

The following is a description of the third embodiment of the invention.

Figure 6:
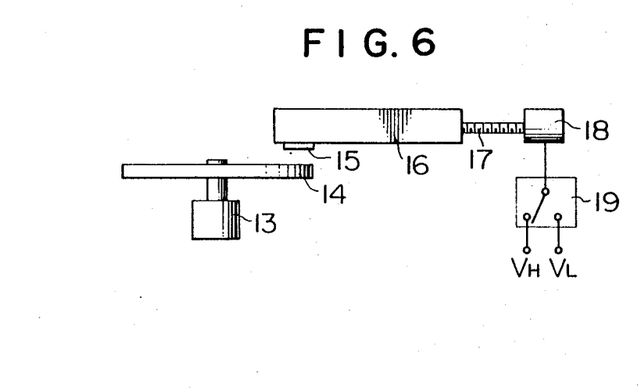
FIG. 6 is a block diagram of a cutting apparatus employed to cut a master disk for an optical disk exclusively used for reproduction in accordance with a third embodiment of the invention.

Referring to FIG. 6 which is a block diagram of the third embodiment, the reference numeral 13 denotes a disk motor which rotates master disk 14 which is to be cut at a predetermined number of revolutions. An optical head 15 which is employed to cut the master disk 14 is secured to an optical feed plate 16 in such a manner that the optical head 15 is movable radially of the master disk 14. A feed screw 17 is provided such as to feed the optical feed plate 16. A feed motor 18 is adapted to rotate the feed screw 17 at a predetermined speed in accordance with a predetermined voltage which is selected by a switch 19, thereby feeding the optical feed plate 16. When the switch 19 selects a high voltage $V_H$, the optical feed plate 16 is fed at high speed, while when the switch 19 selects a low voltage $V_L$, the optical feed plate 16 is fed at low speed.

With the arrangement shown in FIG. 6, when the master disk 14 is cut, the low voltage $V_L$ is selected by the switch 19 for the regions in which data and data managing information are respectively recorded, while the high voltage $V_H$ is selected by the switch 19 for the region in which neither data nor data managing information is recorded. By so doing, the track pitch is increased in the region in which no data nor data managing information is recorded. Accordingly, the number of tracks in the unrecorded region 4 is practically reduced, and it is thereby possible for the retrieval between the data managing information region 2 and the data recording region 3 to be effected at high speed. Further, it is possible to cut the master disk 14 while feeding the optical feed plate 16 at a high feed rate when the unrecorded region 4 is cut. It is therefore possible to reduce the time required to cut the master disk 14.

The fourth embodiment of the invention will now be described.

Figure 7:
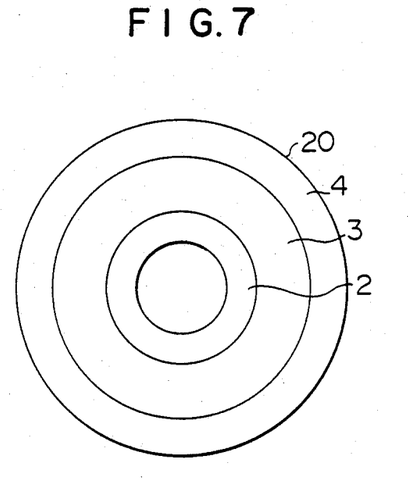
FIG. 7 shows the format of an optical disk exclusively used for reproduction in accordance with a fourth embodiment of the invention in which information has been recorded in the data managing information region from the outermost periphery of the disk.
Figure 8:
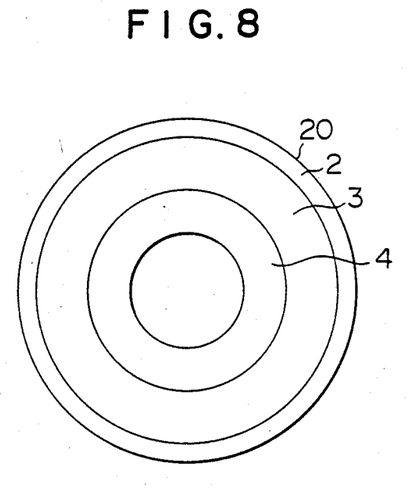
FIG. 8 shows the format of the optical disk in accordance with the fourth embodiment of the invention in which information has been recorded in the data managing information region from the innermost periphery of tme disk.

FIGS. 7 and 8 respectively show signal recording formats of an optical disk 20 exclusively used for reproduction in accordance with the fourth embodiment. FIG. 7 shows the optical disk 20 in which data units are successively recorded in the data managing information region 2 from the innermost periphery of the disk 20, while FIG. 8 shows the optical disk 20 in which data units are successively recorded in the data managing information region 2 from the outermost periphery of the disk 20. The data managing information region 2 is followed by the data recording region 3. The respective track address ranges of the data managing information region 2 and the data recording region 3 are recorded in the first track in the data managing information region 2. Reference numeral 4 denotes a track region where no data are recorded. At the time of starting the operation of the optical disk apparatus, the optical head is positioned in the data managing information region 2 at the innermost periphery (or the outermost periphery) of the optical disk 20 and reads off the respective track address ranges of the data managing information region 2 and the data recording region 3 which have been recorded in the first track in the region 2, whereby it is possible for the optical head to discriminate between the data managing information region 2 and the data recording region 3.

In cutting the master disk for optical disks exclusively used for reproduction, the data managing information region 2 is first cut from the innermost periphery of the master disk in the case of the format shown in FIG. 7 and from the outermost periphery of the disk in the case of the format shown in FIG. 8, and the data recording region 3 is then cut successively to the data managing information region 2.

Figure 9:
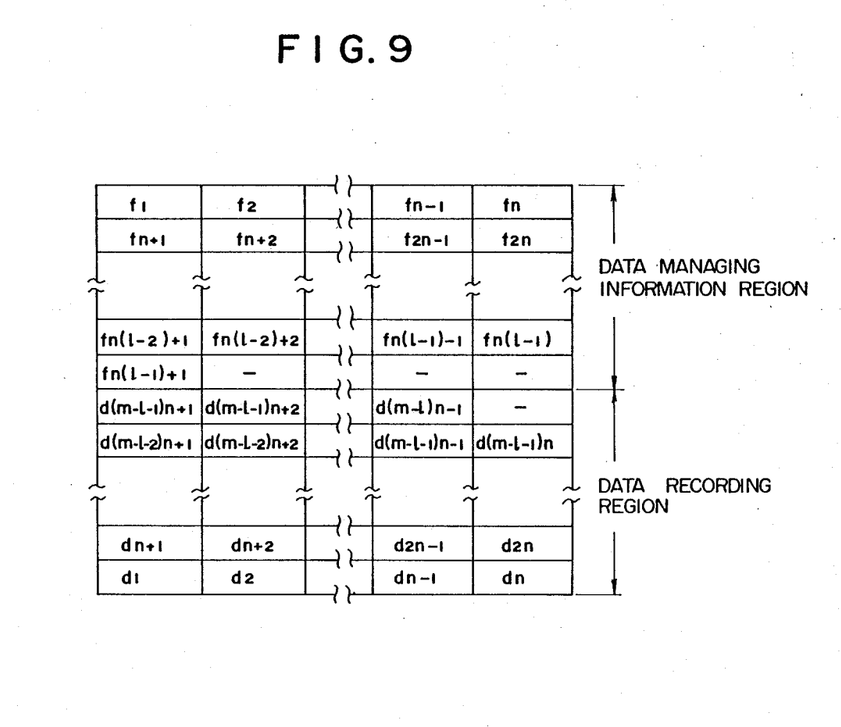
FIG. 9 shows an example of the arrangement of information data units in both of the data managing information region and the data recording region on the optical disk in accordance with the fourth embodiment of the invention.

FIG. 9 exemplarily shows the arrangement of information data units which are recorded in the data managing information region 2 and the data recording region 3 in an optical disk exclusively used for reproduction which has the above-described signal recording format. It is to be noted here that the length of each of the data units which are managed by the respective sectors in the data managing information region 2 is not constant. Every track is divided into n sectors. As to the data managing information region 2, the top information data unit $f_1$ is recorded in the first sector on the first track, and $(l-1)xn+1$ number of information data units are then successively recorded as far as the first sector on the lth track. It is to be noted that no information is recorded in the remaining sectors on the lth track, and the guide groove is formed alone for these sectors. As to the data recording region 3, on the other hand, the top data unit $d_1$ is recorded in the first sector on the m th track, and data units are then successively recorded as far as the n th sector on the m th track. Subsequently, data units are successively recorded in the track which immediately precedes the m th track, that is, the $m-1$ th track, from the first sector to the n th sector thereon. Thus, data units are successively recorded in the respective sectors in the data recording region 3 in ascending order with respect to the sectors and in descending order with respect to the tracks. As a result, $(m-1)xn-1$ number of data units are recorded as far as the $n-1$ th sector on the $l+1$ th track, that is, the track next to the final track in the data managing information region 2. It is to be noted that no information is recorded in the last or n th sector on the $l+1$ th track, and the n th sector is constituted by the guide groove alone.

Assuming now that the number of information data units in the data managing information region 2 is x, and the number of data units in the data recording region 3 is y, the number h of tracks in the data managing information region 2 is given by $h=[x/n]+1$, while the number j of tracks in the data recording region 3 is given by $j=[y/n]+1$. Data units are therefore arranged in accordance with the manner of arrangement shown in FIG. 9 such that data units for the data managing information region 2 are recorded from the first track to the h th track, while data units for the data recording region 3 are recorded from the $h+j$ th track to the $h+1$ th track, and the thus arranged data units are input to the cutting machine. In this case, $[x/n]$ is a maximum integer which does not exceed $x/n$.

The above-described embodiment makes it possible to practically eliminate the unrecorded region between the data managing information region 2 and the data recording region 3 of the optical disk exclusively used for reproduction without sacrificing its interchangeability with an optical disk which enables information to be recorded thereon or recorded information to be erased. Accordingly, no problem arises in, for example, the optical head feeding system at the time of starting the operation of the optical disk apparatus and during the retrieval effected for reproducing the recorded data. It is also possible for a retrieval operation between the data managing information region 2 and the data recording region 3 to be carried out at high speed. Further, since it is only necessary for regions which carry required information to be recorded on the optical disk, it is also possible to reduce the time required for cutting the master disk.

According to the first and second embodiments, when the optical head effects retrieval across the unrecorded region on the optical disk, the probability of a track counting error occurring is small, so that it is possible to carry out the retrieval operation with high accuracy and at high speed. However, since the track pitch in the unrecorded region is the same as that in the recording regions (I) and (II), it is not possible to reduce the time required for cutting the master disk. To overcome such a disadvantage, the track pitch of the guide groove in the first and second embodiments which has no sector structure nor track address section is increased as in the case of the third embodiment, whereby it is possible to obtain an even better format for an optical disk exclusively used for reproduction.

Further, the fourth embodiment provides another excellent format which makes it possible to reduce both the time required for retrieval and the time required for cutting the master disk.

Thus, it is possible according to the present invention to realize a high-speed information reading operation in relation to an optical disk exclusively used for reproduction and a highly efficient master disk cutting operation.

Although the invention has been described through specific terms it is to be noted here that the described embodiments are not exclusive and various changes and modifications may be imparted thereto without departing from the scope of the invention which is limited solely by the appended claims.

What is claimed is:

1. An optical disc, exclusively used for reproduction, having inner and outer peripheries, comprising optically detectable guide groove tracks having numbered addresses formed in the shape of concave and convex elements, the numbers of said addresses increasing successively in one direction, said guide groove tracks being adapted to include thereon data regions and data managing information regions, either one of said data regions and said data managing information regions being arranged in the same direction as that of the direction in which the numbers of said addresses increase, from one of said outer and inner peripheries of said optical disc, the other one of said data regions and said data managing information regions being arranged in the direction which is the reverse of the direction in which the numbers of said addresses increase, from the other one of said outer and inner peripheries, and having a middle region between said data regions and said data managing information regions, said middle region having guide groove tracks which include no data and no addresses.

2. An optical disc as set forth in claim 1, wherein the pitches of said guide groove tracks between said data regions and said data managing information regions, having no data recorded thereon, are greater than that in said data regions and said data managing information regions.

* * * * *